United States Patent
Saha et al.

(10) Patent No.: US 10,805,826 B2
(45) Date of Patent: Oct. 13, 2020

(54) QUALITY OF SERVICE (QOS) SUPPORT FOR TACTILE TRAFFIC

(71) Applicant: Telefonaktiebolaget LM Ericsson (publ), Stockholm (SE)

(72) Inventors: Sumanta Saha, Espoo (FI); Kazi Wali Ullah, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 149 days.

(21) Appl. No.: 16/088,281

(22) PCT Filed: Apr. 4, 2016

(86) PCT No.: PCT/IB2016/051907
§ 371 (c)(1),
(2) Date: Sep. 25, 2018

(87) PCT Pub. No.: WO2017/175027
PCT Pub. Date: Oct. 12, 2017

(65) Prior Publication Data
US 2020/0205025 A1   Jun. 25, 2020

(51) Int. Cl.
*H04W 28/02* (2009.01)
*H04W 12/10* (2009.01)
(Continued)

(52) U.S. Cl.
CPC ....... *H04W 28/0268* (2013.01); *H04W 12/06* (2013.01); *H04W 12/1006* (2019.01); *H04W 28/22* (2013.01)

(58) Field of Classification Search
None
See application file for complete search history.

(56) References Cited

U.S. PATENT DOCUMENTS 8,214,536 B2   7/2012 Zhao
8,346,225 B2 * 1/2013 Raleigh ............... H04L 41/0806
                                                       455/414.1
(Continued)

FOREIGN PATENT DOCUMENTS

EP   2081327 A1   7/2009

OTHER PUBLICATIONS

Fettweis G.P., et al., "The Tactile Internet: ITU-T Technology Watch Report," The Tactile Internet Big Data Spatial Standards Mobile Money Smart Cities E-learning E-health Standards and Interoperability Privacy in Cloud Computing Digital Signage Trends in Video Games and Gaming The Optical World Decreasing Driver Distraction Biometrics and Standards The Future Internet Distri, Aug. 2014, Retrieved from https://www.itu.int/dms_pub/itu-t/oth/23/01/T23010000230001PDFE.pdf on Dec. 14, 2016, 24 pages.
(Continued)

*Primary Examiner* — Alex Skripnikov
(74) *Attorney, Agent, or Firm* — Sage Patent Group

(57) ABSTRACT

Methods of providing quality of service support for tactile traffic are disclosed. In one embodiment, an electronic device notifies a controller that an application has been authorized to transmit tactile traffic in the communication network. The controller, responsive to the notification, causes the backhaul node to install a flow table entry in a flow table of the backhaul node, through which packets of the application is to be forwarded within a latency defined for the tactile traffic by the backhaul node. The electronic device authenticates a packet being sourced from or destined to the application that has been authorized to transmit the tactile traffic in the communication network, and forwards the packet within the latency defined for the tactile traffic.

20 Claims, 9 Drawing Sheets

(51) Int. Cl.
H04W 12/06 (2009.01)
H04W 28/22 (2009.01)

(56) References Cited

U.S. PATENT DOCUMENTS

| | | | |
|---|---|---|---|
| 8,797,867 B1 | 8/2014 | Chen et al. | |
| 2013/0266017 A1 | 10/2013 | Akiyoshi | |
| 2015/0143456 A1* | 5/2015 | Raleigh | H04W 12/0808 |
| | | | 726/1 |
| 2018/0027478 A1* | 1/2018 | Sama | H04W 28/0226 |
| | | | 370/331 |

OTHER PUBLICATIONS

Fettweis, G.P., "The Tactile Internet: Applications and Challenges," IEEE Vehicular Technology Magazine, IEEE 9.1, Mar. 11, 2014, pp. 64-70.

Ito M., "Service-Specific Mobile Network Virtualization Technologies," Journal of the National Institute of Information and Communications Technology, 2015, vol. 62 (2), Jan. 1, 2015, pp. 63-72.

RFC 2983: Black D., "Differentiated Services and Tunnels," Network Working Group, Request for Comments: 2983, Oct. 2000, 14 pages.

Simsek M., et al., "5G-Enabled Tactile Internet," IEEE Journal on Selected Areas in Communications, vol. 34 (3), Mar. 2016, pp. 460-473.

* cited by examiner

700

Notify a Controller (e.g. SDN Controller) that an application has been authorized to transmit tactile traffic in the communication network, the controller communicating with one or more of the access node, the back-haul node, and the core node of a network (e.g., 5G), and the application being deployed in an end-user electronic device, wherein the controller, responsive to the notifying, causes the back-haul node to install a flow table entry in a flow table of the backhaul node, through which packets of the application is to be forwarded with latency defined for tactile traffic by the back-haul node. 702

Authenticate a packet being sourced from or destined to the application being authorized to transmit the tactile traffic in the communication network. 704

Forward the packet with the latency defined for tactile traffic (e.g., 1 ms). 706

FIG. 7

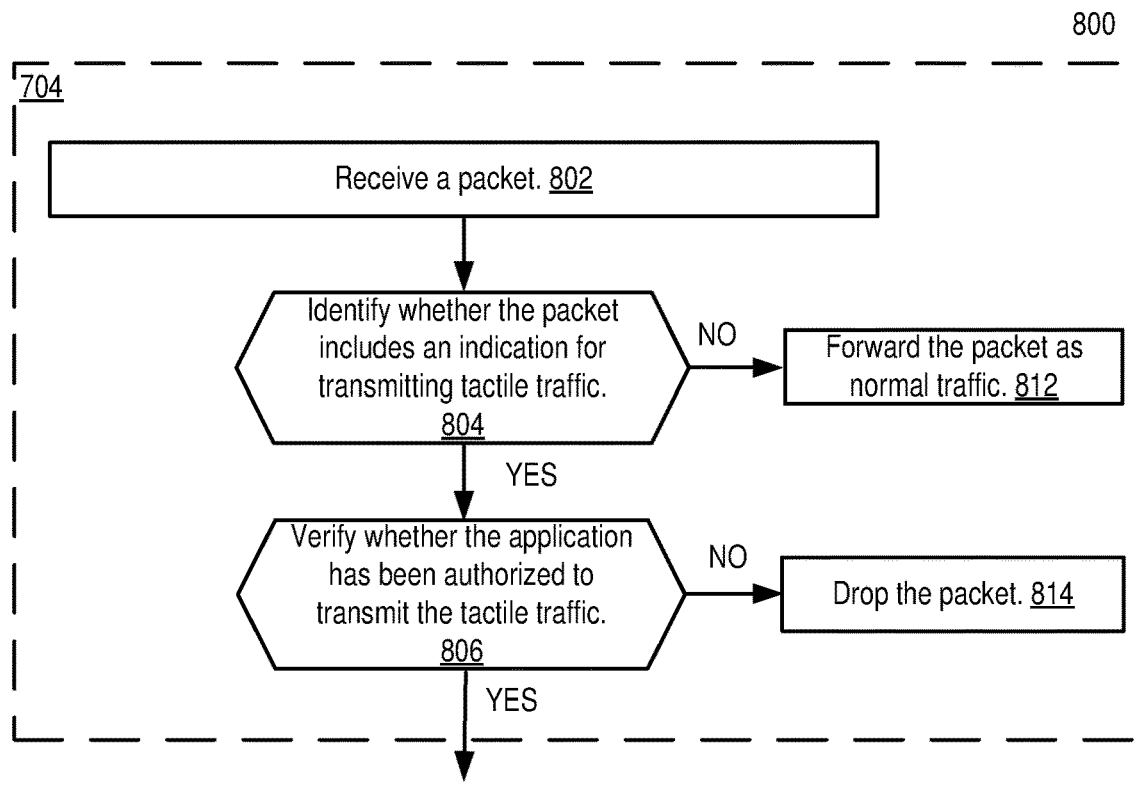

FIG. 8

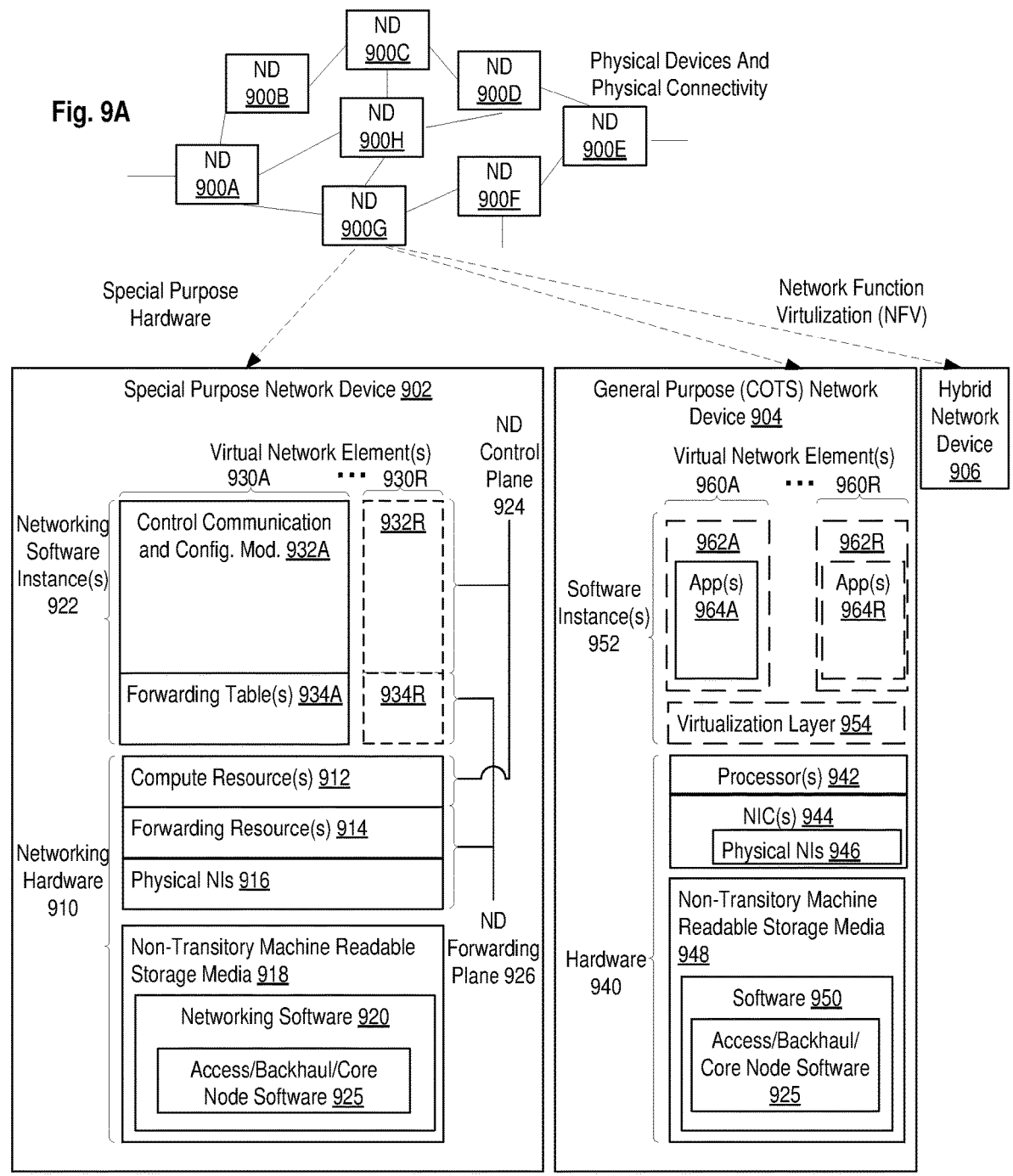

QUALITY OF SERVICE (QOS) SUPPORT FOR TACTILE TRAFFIC

CROSS-REFERENCE TO RELATED APPLICATIONS

This application is a National stage of International Application No. PCT/IB2016/051907, filed Apr. 4, 2016, which is hereby incorporated by reference.

FIELD OF INVENTION

The embodiments of the invention are related to the field of networking. More specifically, the embodiments of the invention relate to systems, method, node, and computer program for providing quality of services (QoS) support for tactile traffic.

BACKGROUND

While people can tolerate about 100 milliseconds (ms) of delay when interacting with an audio conversation and 10 ms to react to a visual incident, only in the order of a few milliseconds is the delay that people can tolerate while performing some haptic tasks such as juggling or driving a car. Any larger delay is noticeable and creates disturbance to the work being done by a person.

The delay requirements are use case specific. For example, to achieve the high fidelity required for telemedical applications, it is necessary to achieve end-to-end latency of 1-10 ms. In another use case of automatic cooperative-driving maneuvers with a bi-directional exchange of data, a latency of less than 1 ms would be needed. Although different use cases may work with different latency, an International Telecommunication Union (ITU) report, "The Tactile Internet—ITU-T Technology Watch Report" dated August 2014, outlines that the latency should not be over 1 ms end-to-end for such an application.

This physical limitation has profound impact on how we design our technologies to work. For example, the audio in a phone conversation can lag 100 ms behind without making the experience unpleasant. Similarly, the TV picture can lag 10 ms without causing any trouble to the audience. However, if a person tries to remotely control a piece of equipment which requires the combination of visual feedback and physical control, 1 ms of delay is enough to create noticeable disturbance in the user experience. Similar delay requirements are also necessary when a machine is using visual feedback and physical control to perform a haptic task e.g. self-driven cars communicating with each other with visual feedbacks to avoid collisions.

With the advent of high speed networks such as 5G (referring to the fifth generation mobile networks or the fifth generation wireless systems) and the associated reach and speed of the Internet, researchers are envisioning a network which will be able to support tactile features of the Internet. For example, users should be able to perform physical tasks such as driving or controlling a machine over the Internet using controllers and actuators without experiencing noticeable delay or lag due to network bandwidth. Thus the high speed networks need to provide mobile applications with a round-trip latency around 1 ms (e.g., no higher than 2 ms), carrier grade robustness and availability (e.g., no high than 50 ms fault recovery and 99%-99.999% availability). These applications are coined as the tactile applications that carry tactile traffic and the network provides these applications as "Tactile Internet" or "Tactile network". In this document, the round-trip latency of around 1 ms (e.g., no higher than 2 ms) is referred to as ultra-low latency.

It is a challenge to prioritize tactile traffic in a network so its quality of services (QoS) requirement can be met.

SUMMARY

Methods of providing quality of service support for tactile traffic are disclosed. In one embodiment, the method is implemented in an electronic device in a communication network, where the communication network includes an access node communicating with end user devices, a backhaul node, and a core node, and the backhaul node transmits traffic between the access node and the core node. The method includes notifying a controller that an application has been authorized to transmit tactile traffic in the communication network, where the controller communicates with one or more of the access node, the backhaul node, and the core node. The application is to be deployed in an end user device. The controller, responsive to the notifying, causes the backhaul node to install a flow table entry in a flow table of the backhaul node, through which packets of the application is to be forwarded within a latency defined for the tactile traffic by the backhaul node. The method also includes authenticating a packet being sourced from or destined to the application that has been authorized to transmit the tactile traffic in the communication network, and forwarding the packet within the latency defined for the tactile traffic.

Apparatus for providing quality of service support for tactile traffic are disclosed. In one embodiment, an electronic device in a communication network is disclosed. The communication network includes an access node communicating with end user devices, a backhaul node, and a core node, and the backhaul node transmits traffic between the access node and the core node. The electronic device comprises a processor and a non-transitory machine-readable storage medium (918, 948) that coupled to the processor. The non-transitory machine-readable storage medium containing instructions, which when executed by the processor, cause the electronic device to notify a controller that an application has been authorized to transmit tactile traffic in the communication network, where the controller communicates with one or more of the access node, the backhaul node, and the core node. The application is to be deployed in an end user device. The controller, responsive to the notifying, is to cause the backhaul node to install a flow table entry in a flow table of the backhaul node, through which packets of the application is to be forwarded within a latency defined for the tactile traffic by the backhaul node. The electronic device is further to authenticate a packet being sourced from or destined to the application that has been authorized to transmit the tactile traffic in the communication network, and the electronic device is further to forward the packet with the latency defined for the tactile traffic.

Non-transitory machine-readable storage media for providing quality of service support for tactile traffic are disclosed. In one embodiment, the non-transitory machine-readable medium has instructions stored therein, which when executed by a processor, cause the processor to perform operations in an electronic device in a communication network. The communication network includes an access node communicating with end user devices, a backhaul node, and a core node, and the backhaul node transmits traffic between the access node and the core node. The operations include notifying a controller that an application has been authorized to transmit tactile traffic in the communication network, where the controller communicates with one or more of the access node, the backhaul node, and the core node. The application is to be deployed in an end user device. The controller, responsive to the notifying, causes the backhaul node to install a flow table entry in a flow table of the backhaul node, through which packets of the application is to be forwarded within a latency defined for the tactile traffic by the backhaul node. The operations also include authenticating a packet being sourced from or destined to the application that has been authorized to transmit the tactile traffic in the communication network, and forwarding the packet within the latency defined for the tactile traffic.

Embodiments of the disclosed techniques provides efficient ways to provide quality of service support for tactile traffic in a network.

BRIEF DESCRIPTION OF THE DRAWINGS

The invention may best be understood by referring to the following description and accompanying drawings that are used to illustrate embodiments of the invention. Like reference numbers and designations in the various drawings indicate like elements. In the drawings:

FIG. 7 is a flow diagram illustrating operations of QoS support for tactile traffic according to one embodiment of the invention.

FIG. 8 is a flow diagram illustrating authentication of a packet for tactile traffic QoS support according to one embodiment of the invention.

FIG. 9A illustrates connectivity between network devices (NDs) within an exemplary network, as well as three exemplary implementations of the NDs, according to some embodiments of the invention.

FIG. 9B illustrates an exemplary way to implement a special purpose network device according to some embodiments of the invention.

DETAILED DESCRIPTION

Figure 1:
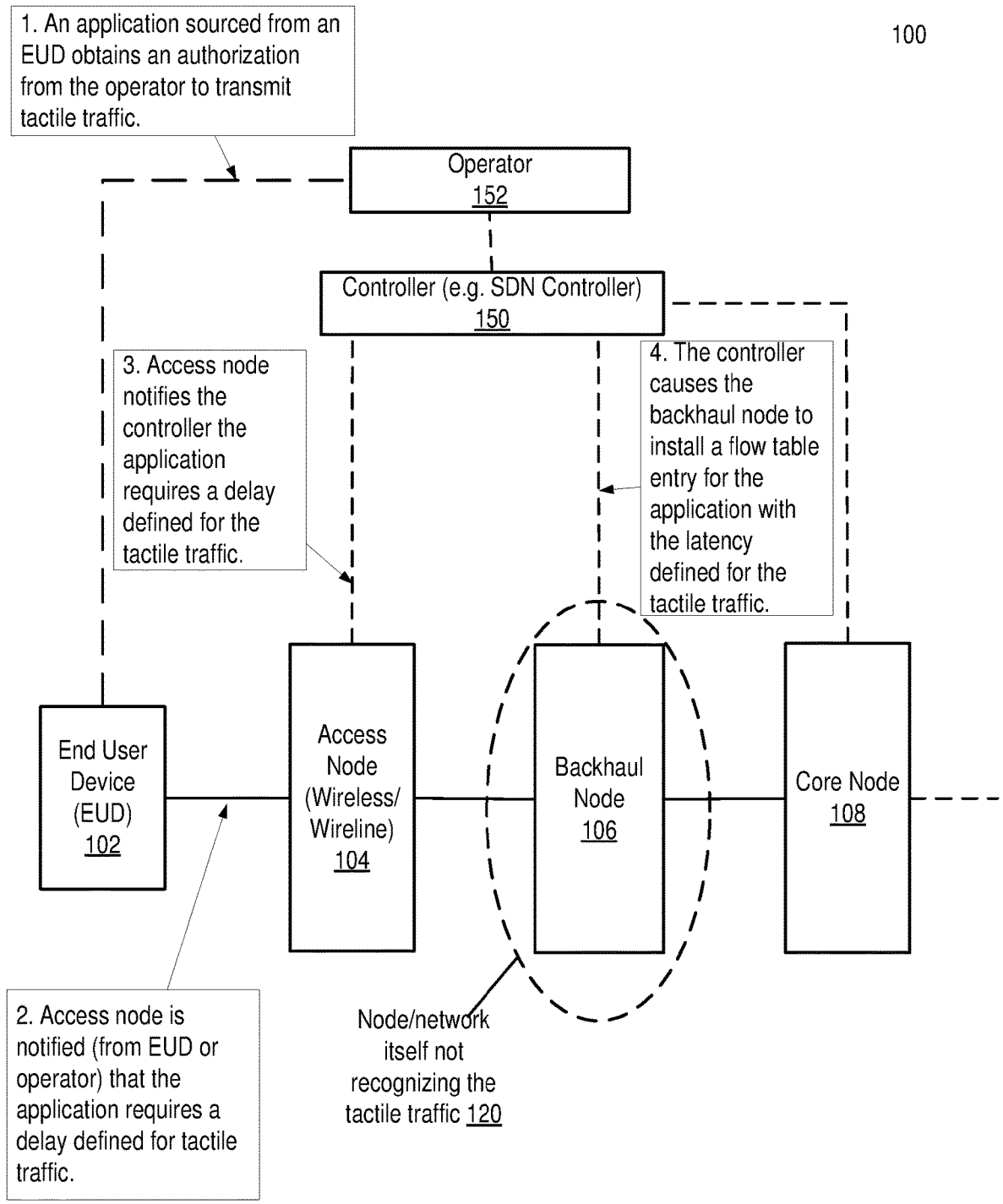
FIG. 1 illustrates provisioning operations of QoS support for tactile traffic according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

Terms

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random-access memory (DRAM), static random-access memory (SRAM)) of that electronic device. Typical electronic devices also include a set or one or more physical network interface(s) to establish network connections (to transmit and/or receive code and/or data using propagating signals) with other electronic devices.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). A node, such as a radio node, a backhaul node, or a core node, includes one or more network devices.

The term "user equipment" (UE) refers to a device for instance used by a person for his or her personal communication. It can be a telephone type of device, for example a telephone or a SIP phone, cellular telephone, a mobile station, cordless phone, or a personal digital assistant type of device like laptop, notebook, notepad equipped with a wireless data connection. The UE may also be associated with humans but also with non-humans like animals, plants, or even machines (so called machine-type communication (MTC) or machine to machine (M2M)). A UE may be equipped with a SIM (Subscriber Identity Module) comprising unique identities such as IMSI (International Mobile Subscriber Identity) and/or TMSI (Temporary Mobile Subscriber Identity) associated with the person using the UE such as a subscriber using the UE. The presence of a SIM within a UE customizes the UE uniquely with a subscription of the subscriber. Such subscriber may also use multiple devices/UEs at the same time.

The term "subscriber" may refer to a human being having a service agreement with a service provider such as an operator. The subscriber may also be a legal entity such as a company operating a pool of MTC devices, and these devices operate independent from any human subscriber. In this case the MTC device is the direct receiver of the service while the service subscription is centrally with the company (indirect receiver of such service) operating the pool of MTC devices. An end user device, also referred to as a subscriber's end user device or end user electronic device, is an electronic device associated with a subscriber and the types of end user device are discussed in more details in relation to FIG. 9A.

The term "communication network" or short "network" may particularly denote a collection of nodes or entities, related transport links, and associated management needed for running a service or an application (in this specification, the terms "service" and "application" are used interchangeably), for example a telephony service or a packet transport service. Depending on the service, different node types or entities may be utilized to realize the service. A network operator owns the communication network and offers the implemented services to its subscribers. Typical examples of a communication network are radio access network (such as 2G (2nd Generation), GSM (Global System for Mobile communications), 3G (3rd Generation), WCDMA (Wideband Code Division Multiple Access), CDMA (Code Division Multiple Access), LTE (Long Term Evolution), WLAN (Wireless Local Area Network), Wi-Fi (Wireless Fidelity)), mobile backhaul network, or core network such as IMS (IP Multimedia System), CS (Circuit Switched) Core, PS (Packet Switched) Core, and 5G. The communication network may also include ones using other wireless communication protocols (such as Bluetooth, ZigBee (ZigBee 2004, 2006, PRO), Z-wave (Z-Wave Alliance), Wi-Fi (IEEE 802.11), wireless personal area network technology (e.g., IEEE 801.15.4), Digital European Cordless Telecommunications (DECT), and WiMax) and ones using wireline media such as optical fibers, copper lines, or power lines and corresponding protocols.

Quality of Service (QoS) in Three Segments of Communication Networks

In order to support tactile applications in a network, the network infrastructure should be able to recognize and/or support prioritizing of tactile traffic. With this recognition and/or support, the tactile traffic would then be provided with a strict priority over the other traffic in the network, which will ensure that the tactile traffic is forwarded towards the destination as soon as possible. One possible way of ensuring such low delay is to place the tactile application as close to the user as possible. However, that alone is not enough to provide consistently such low delay as required by the tactile traffic. The network nodes also need to recognize the need for very low latency and act accordingly.

Presently there are disjoint methods of providing quality of service (QoS) in a network. An access network (interact directly with subscribers and their electronic devices) has its own ways of providing QoS to subscriber traffic while a backhaul network (sometimes referred to as the transmission network), connecting the subscriber traffic from one or more access networks to a core network, is largely unaware of the QoS of the subscriber traffic—the backhaul network may provide QoS to traffic aggregates without knowledge of the QoS at the subscriber level. Further down, the core network again has its own mechanisms to classify and prioritize traffic. Among these three parts of the network (access, backhaul, and core), the access and the core have subscriber level knowledge and can identify subscriber traffic, while the backhaul just sees an aggregation of traffic coming from the access or the core without subscriber level knowledge. Consequently, the backhaul network can classify the traffic based on the traffic's QoS class (e.g. differentiated service code point (DSCP) bits in IP packet or priority code point (PCP) bits on Ethernet packets) but not based on which subscriber the traffic is coming from.

A possible approach in this case is to mark the traffic on the access network side with the subscriber knowledge, and then the marking is honored in the backhaul network. For this approach to work, a suitable granularity of marking is necessary to communicate the classes of traffic that a tactile application needs. On the other hand, the QoS indication bits of the existing packet protocols (Ethernet, IP, etc.) has already been used extensively to communicate classes of service, and it is hard to reserve any particular bit combination now for traffic that requires as low delay as tactile traffic. For example, in the backhaul IP network, there are already well-known expectations on how the QoS prioritization work, and what marking should receive what treatment. Therefore, ensuring QoS for tactile traffic over high speed network such as 5G requires additional methods of communication, which will ensure that in addition to the existing QoS classes, the backhaul network devices are able to support more fine-grained QoS possibilities.

Ensuring QoS requirements of tactile traffic require resources and processing power of the network devices on its path, and thus, a mechanism is needed to ensure that no one can misuse the provisioning. In order to prevent such misuse where a subscriber's end user device just sets the indication bit for tactile traffic (even when its traffic does not require the ultra-low latency) to receive the topmost QoS, there needs to be an additional layer of authorization for the tactile traffic. That is, whether the source from where the traffic originates is authorized to send such traffic needs to be first confirmed. However, prior solutions do not have this capability in the backhaul network, because those networks do not have any subscriber level knowledge. However, the access nodes and core nodes have subscriber level knowledge, and it is possible that with that knowledge, these nodes mark the packets and the backhaul network will respect the marking.

Many existing traffic requires expedited QoS in the backhaul network, such as the timing traffic (e.g., network time protocol (NTP) and precision time protocol (PTP)), and others traffic require strict delay bound, such as voice and video. However, these existing traffic is expedited or given proper quality of service by grouping them within a certain QoS indicator value in the Ethernet or IP packet.

Additionally, for traffic with extremely low delay requirement (such as PTP, where clock accuracy may be required to be in nanoseconds), usually hardware support is added to the switch chips, and protocol level filters are available to filter out those packets. This class of traffic does not require any subscriber level marking or any authorization to use the QoS indicators.

Thus, a packet level marking (QoS indicator) in the QoS fields of a packet or a protocol filter in a node is enough for the packets of a particular traffic flow to receive best effort QoS guarantee. However, for tactile traffic, the scenario is more complex. It requires even stricter QoS and it does not contain any clear indication for a network device such as a switch/router to filter it out, making it difficult for a backhaul network to provide the required QoS service. Moreover, the expectations of QoS class for tactile traffic might vary widely based on the use case and the provided service by the operator.

There have been solutions proposed with a similar packet marking previously. However, those solutions address a different set of problems and work with node to node quality of service, or a device-internal selection algorithm rather than subscriber level knowledge transferring to a network such as backhaul network. For tactile traffic, processing traffic using subscriber level knowledge across all three segments of communication networks is desirable.

Operations of QoS Support for Tactile Traffic

FIG. 1 illustrates provisioning operations of QoS support for tactile traffic according to one embodiment of the invention. The system 100 includes an end user device 102, which is coupled to a network including an access node 104, a backhaul node 106, a core node 108, all of which communicate with one or more controllers such as controller 150.

The access node 104 may be a wireless or a wireline access node. A wireless access node is often referred to as a radio access node that communicates with the end user device 102 through radio signals. The access node 104 is the entry node of data from the end user device 102 to the network, and the communication between the end user device 102 and the access node 104 may be through various protocols discussed in relation to the definition of the term "communication network" herein above. The access node 104 may be aware of a subscriber, i.e., it may identify from which end user device that particular traffic comes. The access node 104 may also identify the one or more applications that the particular traffic is for. Thus, the access node 104 may be aware of the QoS requirement of the particular traffic for a particular application of a particular subscriber. With the knowledge, the access node 104 may forward a particular traffic with a suitable priority so that the QoS requirement of the particular traffic may be satisfied.

The core node 108 is at the core of the network. The core node 108 may be connected with other core nodes (not shown) in a mesh topology to forward traffic from one part of the network to another part and the traffic may arrive at the destined end user device. The core node 108 may be aware of a subscriber or subscriber's application. For example, a core node such as a serving gateway (S-GW), a packet data network gateway (P-GW), or a mobility management entity (MME) typically identifies a session by a session identifier associated with a subscriber or subscriber's application. Such identification is necessary at least for network management purposes (such as billing, service authorization). Thus, the core node 108 may be aware of the QoS requirement of the particular traffic for a particular application of a particular subscriber. With the knowledge, the core node 108 may also forward the particular traffic with a suitable priority so that the QoS requirement of the particular traffic may be satisfied.

The backhaul node 106 aggregates traffic from one or more access nodes such as the access node 104. A backhaul node may be connected with the one or more access nodes through wireline or wirelessly. For example, a backhaul node may connect a base station (a type of an access node) at one end, and connect a core node at the other end, so that the traffic from a UE may be transmitted to the core node. Thus a backhaul node may be an intermediary between an access node and a core node. The backhaul node is typically unaware of a particular subscriber whose traffic the backhaul node forward to or source from. The backhaul node may be made aware of the QoS requirement for an aggregate of traffic flows, where the traffic flows are from different end user devices or different applications of the same end user device, but that knowledge alone would be insufficient to meet QoS requirement of a particular tactile traffic flow within the traffic flow aggregate containing multiple traffic flows. Thus, as illustrated at reference 120, backhaul node 106 is in the segment of node/network that, by itself, does not recognize the tactile traffic.

A controller 150 is in communication with the access node 104, backhaul node 106, and/or core node 108. Each node has an interface for communication with a controller, although all the nodes may not communicate with the same controller. A controller is responsible for coordinating traffic forwarding at various nodes. The controller is a software-defined networking (SDN) controller in one embodiment. The SDN controller (also referred to as network controller and the two terms are used interchangeably) may be renamed as other entities such as multi-layer wide-area network (WAN) controller (MLWC). Regardless of different names, the SDN/network controller perform functions described in more details in relation to FIGS. 9A-F and 10.

An operator 152 is the operator of the system 100. The operator 152 manages the end user device 102, who gets an authorization from the operator 152 to transmit tactile traffic for one or more applications. The operator 152 may also inform the nodes (which are aware of subscribers such as the access node 104 and core node 108) that the one or more applications of the end user device 102 are allowed to transmit the tactile traffic. It is to be noted that multiple operators may exist in the system 100, and the operator managing the end user device 102 may be different from the operator managing other nodes. Additionally, the operator managing the backhaul node 106 may be different from the one managing the access node 104 or the core node 108. Also, the operator 152 and controller 150 may be implemented in a single electronic device.

While only one of each type of devices is illustrated, a typical system contains a plurality of end user devices, access nodes, backhaul nodes, and/or core nodes. Additionally, traffic of an end user device may be forwarded cross multiple access nodes, backhaul nodes, and/or core nodes. When multiple nodes are the same type of nodes, that plurality of same type nodes are referred to as a network, e.g., an access network with a plurality of access nodes, a backhaul network with a plurality of backhaul nodes, and a core network with a plurality of core nodes.

FIG. 1 includes task boxes 1-4 that illustrate a sequence of provision operations according to one embodiment of the invention. At task box 1, the end user device 102 obtains an authorization from the operator 152 to transmit tactile traffic. The end user device 102 may initiate an application that requires an ultra-low latency of tactile traffic. The application may be any of haptic tasks over Internet including the telemedical applications discussed herein above. The application starts a communication session in the system 100. The operator 152 may grant the authorization based on a variety of factors. For example, the subscriber using the end user device 102 may provide monetary compensation specifically for the application, and upon agreement of the subscriber to pay, the operator 152 grants the authorization. The subscriber may also be in a class of privileged subscribers, and/or the application may be in a class of privileged applications that require a QoS including the ultra-low latency. The operator 152 may also check the network status, determine whether or not the network has enough resources to support the application, and only grant the authorization if the network has enough resources.

At task box 2, the access node 104 is notified that the application requires a delay defined for tactile traffic. The notification may be from the end user device 102 or from the operator 152. The notification may specify a session identifier (ID) of the communication session for the application. The session ID may be in the form of tunnel endpoint identifier (TEID) when general packet radio service (GPRS) tunneling protocol (GTP) is used for the application. The notification may specify, alternatively or additionally, a subscriber ID of the subscriber using the end user device 102.

The notification may also specify a particular QoS requirements of the tactile traffic. The access node 104 may support a plurality of QoS for tactile traffic, and the notification may indicate which one of the QoS for this application being applicable. For example, the access node 104 may support different ultra-low latencies such as 0.2 ms, 0.5 ms, and 1 ms, and the notification uses one or more QoS bits indicating the latency requirement of the application. For example, bit value of 00 represents the required ultra-low latency being 0.2 ms, bit value of 01 represents the required ultra-low latency being 0.5 ms, and bit value of 10 represents the required ultra-low latency being 1 ms. In one embodiment, there is only one QoS latency requirement for tactile traffic, thus a single bit indicating whether or not the traffic being tactile is sufficient.

Figure 3:
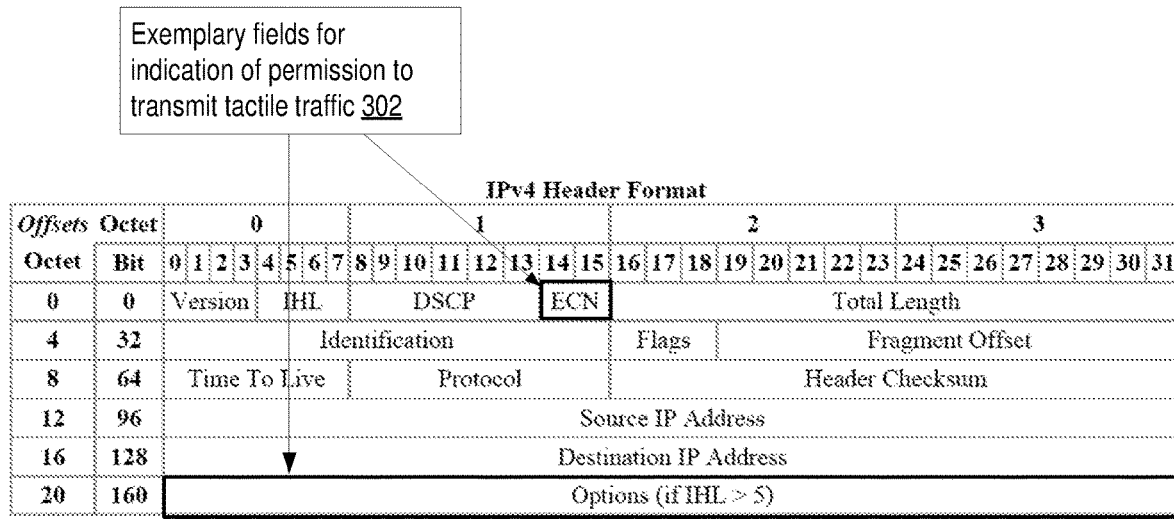
FIG. 3 illustrates fields in a packet header that may be used for tactile traffic transmission according to one embodiment of the invention.

FIG. 3 illustrates fields in a packet header that may be used for tactile traffic transmission according to one embodiment of the invention. The figure illustrates an IPv4 packet header. Within the IPv4 packet header, as known in the art, the DSCP field identifies the type of service for the packet. The DSCP bits are used as standard-based QoS indication (e.g., IETF request for comments (RFC) 2983) for existing applications, thus they can't be used to indicate the QoS requirement of tactile traffic. Instead, the tactile traffic may use other fields for its QoS indication and for indicating the subscriber and/or application being allowed to transmit tactile traffic. It is to be noted that the other fields and the patterns of bits in the other fields to indicate the QoS and the allowed subscriber and/or application may be chosen by the operator 152. As long as the selection is known by the nodes that are aware of subscribers and the fields and patterns of bits in the fields are not used for purposes other than transmitting tactile traffic in the network, the choice should be acceptable.

For example, reference 302 illustrates the exemplary fields for indication of authorization to transmit tactile traffic. The field may be the explicit congestion notification (ECN) field and/or the options field, which exists when the Internet header length (IHL) is over 20 bytes (5×32=160 bits=20 bytes). In one embodiment, the ECN field indicates the QoS requirement of the tactile traffic thus functions as the QoS bits, while the options field indicates the session ID and/or the subscriber ID, the session/subscriber of which are allowed to transmit the tactile traffic. In an alternative embodiment, either field may include both the QoS requirement and the session/subscriber ID.

While the IPv4 packet header is illustrated, it is to be noted that field(s) in IPv6 packet header may also be used as QoS bits for tactile traffic and session/subscriber ID. Indeed, not only that the packet header in the IP layer (which is in the open systems interconnection (OSI) layer 3) may be used, but also the frame header in the Ethernet layer (which is in the OSI layer 2) may be used as QoS bits for tactile traffic and session/subscriber ID. Indeed, the principle of the invention may be used in proprietary protocols and field(s) in their packet headers, where the field(s) are used as the QoS bits for tactile traffic and session/subscriber ID.

With the notification, the access node 104 knows that the application has the authorization to transmit tactile traffic, and the access node 104 will forward packets of the application as tactile traffic upon receiving the packets of the application. In order to do that, the access node 104 may set up forwarding rules and/or generate forwarding entries. For example, when the access node 104 is a traditional network device such as a router or a switch, the access node 104 may program the adjacency and route information regarding the tactile traffic and the system 100 into one or more forwarding structures (e.g., Forwarding Information Base (FIB), Label Forwarding Information Base (LFIB), and one or more adjacency structures) for forwarding the tactile traffic. When the access node 104 is a network device managed by a SDN controller (an embodiment of the controller 150), the access node 104 may, based on input from the SDN controller, install a flow table and one or more flow table entries within the flow table for forwarding the tactile traffic.

At task box 3, the access node 104 notifies the controller 150 that the application requires a delay defined for the tactile traffic. The notification from the access node 104 may contain the same information regarding the application as the notification the access node 104 received at task box 2, or the notification from the access node 104 may contain more or less information than the notification the access node 104 receives. In one embodiment, the notification takes the form of a PACKET_IN message in compliance with the Open Networking Foundation (ONF) standards.

At task box 4, the controller causes the backhaul node 106 to install a flow table entry in a flow table, through which packets of the application from the end user device is to be forwarded within the latency defined for the tactile traffic by the backhaul node. As discussed herein above, the backhaul node 106 does not, by itself, recognizes the tactile traffic that has the authorization from the operator 152 to transmit within the delay defined for the tactile traffic. However, in one embodiment, based on the notification from task box 3, the controller 150 recognizes the tactile traffic having the authorization to transmit within the delay defined for the tactile traffic. Thus, the controller sends a message to the backhaul node 106, where the message takes the form of PACKET_OUT in compliance with the ONF standards. The message causes the backhaul node 106 install the flow table entry in the flow table of the backhaul node 106.

Figure 4:
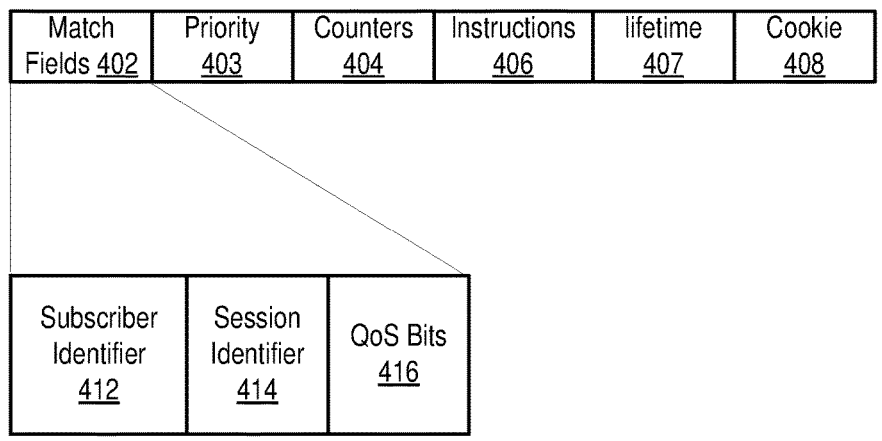
FIG. 4 illustrates a flow table entry for a backhaul node according to one embodiment of the invention.

FIG. 4 illustrates a flow table entry for a backhaul node according to one embodiment of the invention. A flow table entry 400 in a backhaul node such as the backhaul node 106 is illustrated to include the following fields:

Match fields 402: To match against packets. The composition of the match fields is detailed herein below.

Priority 403: Matching precedence of the flow table entry.

Counters 404: Counting the number of packet matching; Updated when packets are matched.

Instructions 406: Actions to modify the action set or packet pipeline processing of a matching packet. The instruction 406 is generated to forward the matching packets within the latency defined for the tactile traffic.

Lifetime 407: Maximum amount of time or idle time before flow is expired by the network element. Lifetime may also called timeout in some embodiments.

Cookie 408: Opaque data value chosen by the SDN controller. May be used by the controller to filter flow statistics, flow modification, and flow deletion.

The match fields 402 includes one or more sub-fields such as subscriber ID 412, session ID 414, and/or QoS bits 416. The values of these fields are based on the corresponding values of these fields from the notification coming from the controller 150 in one embodiment. Since the notification is based on information received from the access node 104, the backhaul node 106 may install the flow table entry so that the backhaul node 106 forwards packets of the tactile traffic similarly as the access node 104, despite that the backhaul node 106 by itself does not recognizes the tactile traffic.

It is to be noted that the sub-fields 412-416 are for illustration only and more or less sub-fields may be used for the match fields in a different embodiment. For example, the match fields may include only the subscriber ID or the session ID, when the matching of one is sufficient to identify the tactile traffic. Additionally, there may only be a single QoS bit (instead of a plurality of QoS bits 416 indicating one of the ultra-low latencies supported) to verify a matching packet requires to be forwarded within the latency defined for the tactile traffic.

Figure 2:
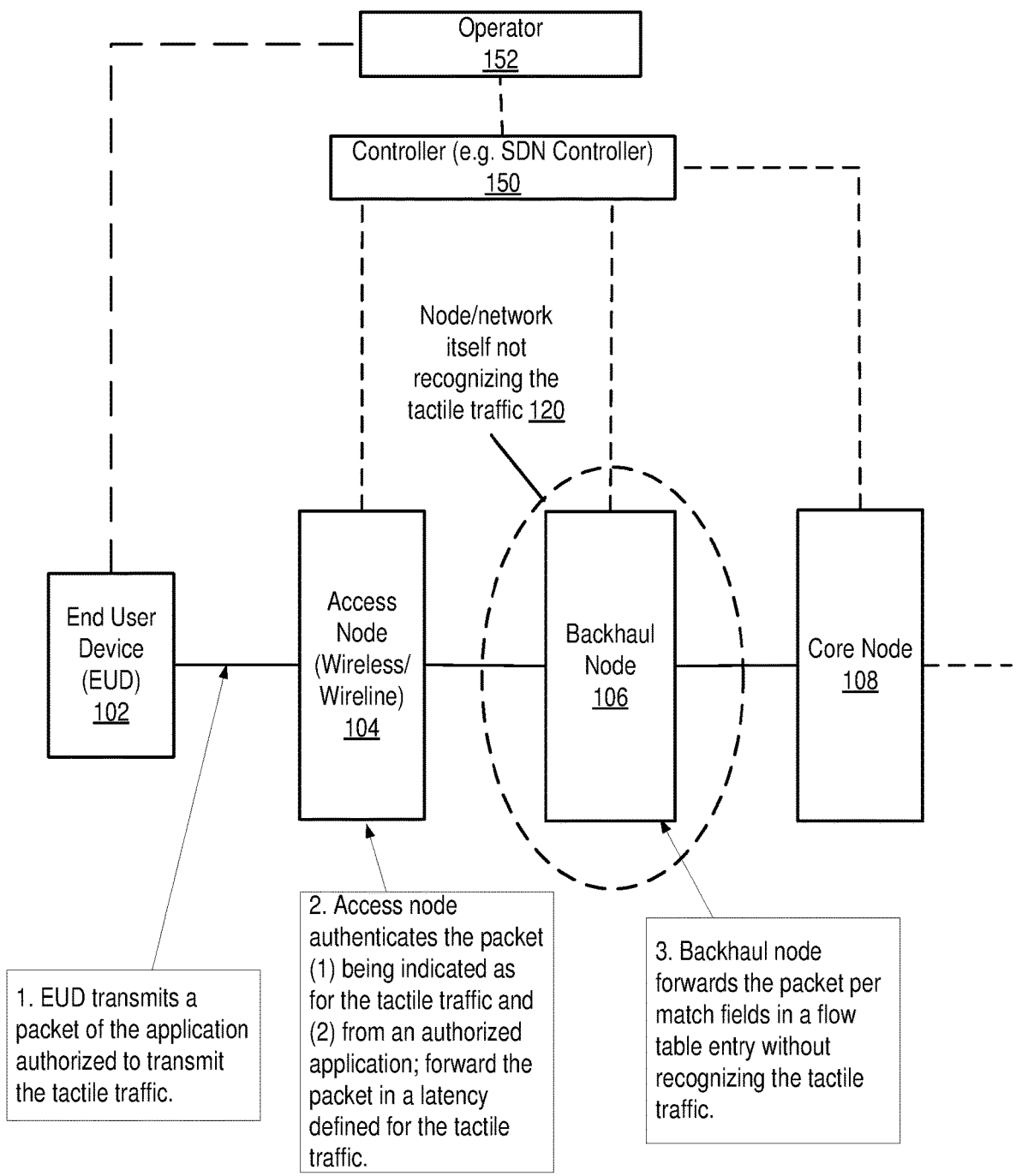
FIG. 2 illustrates forwarding operations of QoS support for tactile traffic according to one embodiment of the invention.

FIG. 2 illustrates forwarding operations of QoS support for tactile traffic according to one embodiment of the invention. The system 100 in FIG. 2 is the same as the one in FIG. 1, and the same or similar references indicate elements or components having the same or similar functionalities. Task boxes 1-3 illustrate a sequence of traffic forwarding operations according to one embodiment of the invention.

At task box 1, the end user device 102 transmits a packet of the application that is authorized to transmit the tactile traffic. The transmission of the packet may occur right after the end user device 102 obtaining the authorization to transmit the tactile traffic and it may occur sometime later when the packet of the tactile traffic is generated. The packet may include the information regarding the authorization to transmit the tactile traffic. In one embodiment, the information includes the session/subscriber ID of the application and the one or more QoS bits of the tactile traffic. The session/subscriber ID and the one or more QoS bits are discussed in more details in relation to FIGS. 1 and 3. The information regarding the authorization to transmit the tactile traffic may be marked on the packet through an operator certified applications that are able to mark the outgoing packets with the information in one embodiment.

At task box 2, the access node 104 authenticates the packet (1) being indicated as for a tactile traffic and (2) from an authorized application. If the packet is authenticated, the packet is forwarded at the access node 104 within a latency defined for the tactile traffic. In one embodiment, if the access node determines that the packet has not been indicated as for the tactile traffic (e.g., no indication of the one or more QoS bits for the tactile traffic) in the packet (e.g., the packet header) for transmitting the tactile, the packet will be forwarded as regular traffic instead of the tactile traffic.

If the packet is not from an authorized application, which the access node determines through finding the session/subscriber ID in the packet (e.g., the packet header) not being authorized to transmit the tactile traffic, but the packet is indicated for the tactile application, the packet is dropped in one embodiment. In an alternative embodiment, the packet is forwarded without being prioritized as tactile traffic. When the packet is to forwarded at the access node 104 within the latency defined for the tactile traffic, the access node 104 utilizes the programmed one or more forwarding structures or the flow table or flow table entries installed during the provision phase discussed in relation to FIG. 1 task box 2 discussed herein above, so that the packet is forwarded to the next node (the backhaul node 106 in this example) within the latency defined for the tactile traffic.

At task box 3, the packet is received at the backhaul node 106, and the backhaul node 106 forwards the packet per the match fields in a flow table entry without recognizing the tactile traffic. The flow table entry and the associated flow table are installed in the provision phase discussed in relation to FIGS. 1 and 4. The matching at the backhaul node 106 is to authenticate that the packet is allowed to be transmitted within the latency defined for the tactile traffic and it may be viewed as a two-step authentication verifying that the packet (1) being for a tactile application (e.g., through matching to the QoS bits 416) and (2) from an authorized application (e.g., through matching to subscriber ID 412 and/or the session ID 414).

Figure 5:
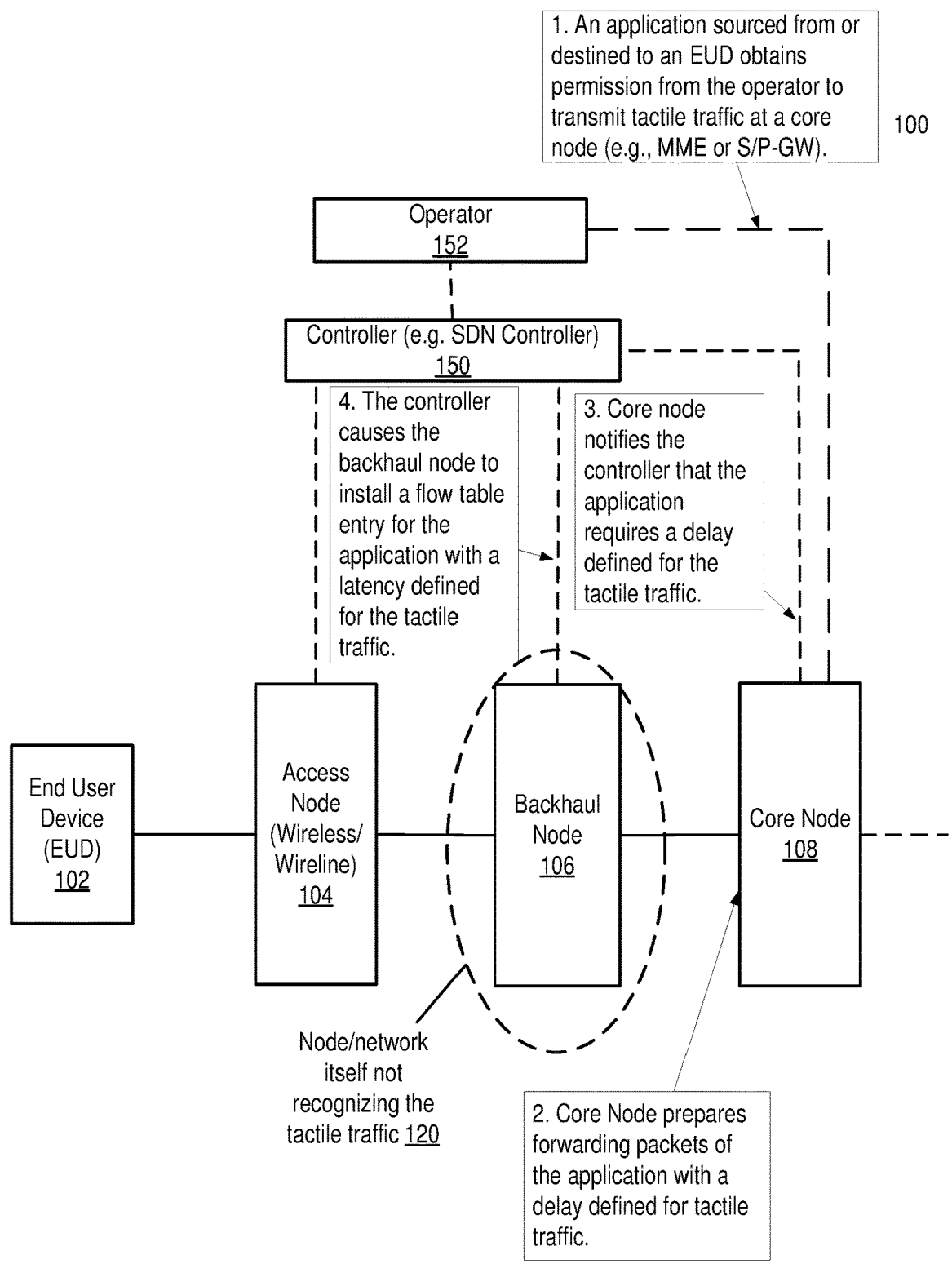
FIG. 5 illustrates provisioning operations of QoS support for tactile traffic according to another embodiment of the invention.

FIG. 5 illustrates provisioning operations of QoS support for tactile traffic according to another embodiment of the invention. FIG. 5 is similar to FIG. 1 and the same or similar references indicate elements or components having the same or similar functionalities. Only the difference between the two figures are discussed. FIG. 5 includes task boxes 1-4 that illustrate a sequence of provision operations according to one embodiment of the invention. In contrast to FIG. 1, the request for transmitting tactile traffic is from the core node 108.

At task box 1, an application sourced from or destined to an end user device (e.g., the end user device 102) obtains an authorization from the operator 152 to transmit tactile traffic at the core node 108. As discussed herein above, a core node may be aware of a subscriber or subscriber's application.

The subscriber using the end user device and/or the subscriber's application may obtain the authorization to transmit the tactile traffic. The operator 152 may grant the authorization based on where the application is sourced from or destined to, and the operator 152 may grant the authorization based on factors same or differently from the variety of factors discussed herein above in relation to task box 1 of FIG. 1.

At task box 2, the core node 108 prepares forwarding packets of the application with a delay defined for tactile traffic. In one embodiment, the core node 108 may set up forwarding rules and/or generate forwarding entries, similar to the access node 104 at task box 2 as discussed herein above.

At task box 3, the core node 108 notifies the controller 150 that the application requires a delay defined for the tactile traffic. At task box 4, the controller causes the backhaul node 106 to install a flow table entry in a flow table, through which packets of the application is to be forwarded within the latency defined for the tactile traffic by the backhaul node. Operations in both task boxes are similar to the corresponding task boxes in FIG. 1 thus not repeated here.

Figure 6:
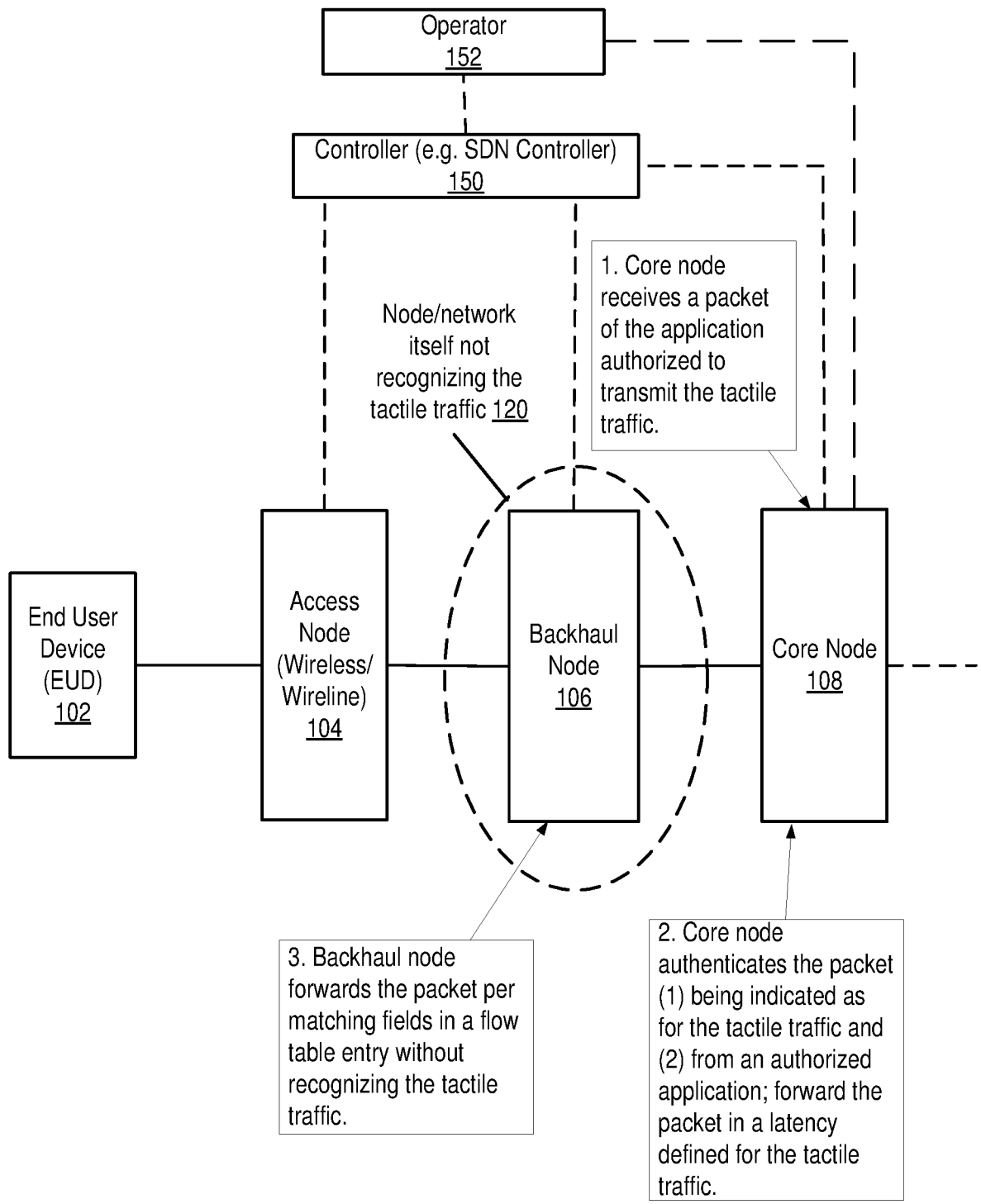
FIG. 6 illustrates forwarding operations of QoS support for tactile traffic according to another embodiment of the invention.

FIG. 6 illustrates forwarding operations of QoS support for tactile traffic according to another embodiment of the invention. FIG. 6 is similar to FIG. 2 and the same or similar references indicate elements or components having the same or similar functionalities. Only the difference between the two figures are discussed. FIG. 6 includes task boxes 1-3 that illustrate a sequence of forwarding operations according to one embodiment of the invention. In contrast to FIG. 2, the packet is from the core node 108.

At task box 1, the core node 108 receives a packet of the application that is authorized to transmit the tactile traffic. The tactile traffic are for the application that is authorized in FIG. 5. The packet may include the information regarding the authorization to transmit the tactile traffic similar to the packet received from the access node 104 at task box 1 of FIG. 2.

At task box 2, the core node 108 authenticates the packet (1) being indicated as for a tactile traffic and (2) from an authorized application. If the packet is authenticated, the packet is forwarded at the core node 108 within a latency defined for the tactile traffic. At task box 3, the packet is received at the backhaul node 106, and the backhaul node 106 forwards the packet per the match fields in a flow table entry without recognizing the tactile traffic. Operations in both task boxes are similar to the corresponding task boxes in FIG. 2 thus not repeated here.

Flow Diagrams

FIG. 7 is a flow diagram illustrating operations of QoS support for tactile traffic according to one embodiment of the invention. Method 700 may be implemented in an electronic device of a communication network. The electronic device may comprise the access node 104 or the core node 108 as illustrated in FIGS. 1-2 and 5-6 according to embodiments of the invention. In one embodiment, the communication network is a fifth generation (5G) mobile network.

At reference 702, the electronic device notifies a controller that an application has been authorized to transmit tactile traffic in a communication network. The controller communicates with one or more of the access node, the backhaul node, and the core node of the communication network. The application is to be deployed in an end user device. In one embodiment, the end user requests an authorization (e.g., from an operator of the communication network) for the application to transmit the tactile traffic. Once the authorization is obtained, and the end user device may notify the electronic device that the application has been authorized in one embodiment.

The controller is a SDN controller in one embodiment of the invention. The controller, responsive to the notifying, causes the backhaul node to install a flow table entry in a flow table of the backhaul node, through which packets of the application is to be forwarded within a latency defined for the tactile traffic by the backhaul node. In one embodiment, the latency defined for the tactile traffic is less than one millisecond. In one embodiment, the backhaul node forwards the packets of the application based on the flow table entry with one or more matching fields of a subscriber identifier, a session identifier, and one or more quality of service bits. The values of the subscriber identifier, the session identifier, and the one or more quality of service bits are set based on the notification the controller received from the electronic device as discussed herein above.

At reference 704, the electronic device receives a packet, and the electronic device authenticates that the packet being sourced from or destined to the application that has been authorized to transmit the tactile traffic in the communication network. More details of operations at reference 704 are discussed in relation to FIGS. 2, 6, and 8. In one embodiment, an indication of the packet is set to indicate the authorization for the application to transmit the tactile traffic, and the electronic device authenticates the packet based on the indication. In one embodiment, the indication includes one or more of a subscriber identifier, a session identifier; and one or more quality of service bits.

At reference 806, the electronic device forwards the packet with the latency defined for the tactile traffic. The packet forwarding is described in more details in relation to FIG. 2.

FIG. 8 is a flow diagram illustrating authentication of a packet for tactile traffic QoS support according to one embodiment of the invention. Method 800 is an embodiment of operations in reference 704.

At reference 802, the electronic receives a packet. At reference 804, the electronic device identifies whether or not the packet includes an indication for transmitting tactile traffic. In one embodiment, the indication for transmitting the tactile traffic includes one or more QoS bits in a field (e.g., the ECN field discussed herein above) are set to indicate the authorization for the application. If the packet does not include the indication for transmitting the tactile traffic, the flow goes to reference 812, wherein the packet is forwarded as normal traffic, without being expedited and forwarded within the latency defined for the tactile traffic. If the packet does include the indication for transmitting the tactile traffic, the flow goes to reference 806.

At reference 806, the electronic device verifies whether the application has been authorized to transmit the tactile traffic. In one embodiment, the indication for authorization to transmitting the tactile traffic includes one or more of (1) a subscriber ID that identifies the subscriber using the application deployed in the end user device; (2) a session ID that identifies the communication session of the application transmitting in the communication network.

Through embodiments of the invention, nodes that by itself do not recognize tactile traffic may forward the tactile traffic based on installed flow table entries, which is installed based information from a controller such as a SDN controller. The controller in turn obtains information about the tactile traffic from a node that is aware of the tactile traffic.

SDN and NFV Environment Utilizing Embodiments of the Invention

Embodiments of the invention may be utilized in a SDN and NFV network containing network devices. FIG. 9A illustrates connectivity between network devices (NDs) within an exemplary network, as well as three exemplary implementations of the NDs, according to some embodiments of the invention. FIG. 9A shows NDs 900A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 900A, E, and F illustrates that these NDs act as ingress and egress points for the network (and thus, these NDs are sometimes referred to as edge NDs; while the other NDs may be called core NDs). However, in some embodiments, NDs like the S-GW and P-GW are at the edge of connecting operator network but they are still referred to as core NDs and not edge NDs.

Two of the exemplary ND implementations in FIG. 9A are: 1) a special purpose network device 902 that uses custom application-specific integrated-circuits (ASICs) and a proprietary operating system (OS); and 2) a general purpose network device 904 that uses common off-the-shelf (COTS) processors and a standard OS.

The special purpose network device 902 includes networking hardware 910 comprising compute resource(s) 912 (which typically include a set of one or more processors), forwarding resource(s) 914 (which typically include one or more ASICs and/or network processors), and physical network interfaces (NIs) 916 (sometimes called physical ports), as well as non-transitory machine readable storage media 918 having stored therein networking software 920, including access node, backhaul node, and/or core node software 925. When the access node, backhaul node, and the core code operates as a network element of a SDN system, their functionalities may be similar, particularly in forwarding packets based on flow table and flow table entries. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 900A-H. During operation, the access/backhaul/core node software 925 may be executed by the networking hardware 910 to instantiate a node software instance, which perform operations as discussed herein above in relation to FIGS. 1-2 and 5-8. The node software instance and that part of the networking hardware 910 that executes that instance (be it hardware dedicated to that networking software instance and/or time slices of hardware temporally shared by that networking software instance with others of the networking software instance 922), form a separate virtual network element 930A-R. Each of the virtual network element(s) (VNEs) 930A-R includes a control communication and configuration module 932A-R (sometimes referred to as a local control module or control communication module) and forwarding table(s) 934A-R, such that a given virtual network element (e.g., 930A) includes the control communication and configuration module (e.g., 932A), a set of one or more forwarding table(s) (e.g., 934A), and that portion of the networking hardware 910 that executes the virtual network element (e.g., 930A).

The special purpose network device 902 is often physically and/or logically considered to include: 1) a ND control plane 924 (sometimes referred to as a control plane) comprising the compute resource(s) 912 that execute the control communication and configuration module(s) 932A-R; and 2) a ND forwarding plane 926 (sometimes referred to as a forwarding plane, a data plane, or a media plane) comprising the forwarding resource(s) 914 that utilize the forwarding table(s) 934A-R and the physical NIs 916. By way of example, where the ND is a router (or is implementing routing functionality), the ND control plane 924 (the compute resource(s) 912 executing the control communication and configuration module(s) 932A-R) is typically responsible for participating in controlling how data (e.g., packets) is to be routed (e.g., the next hop for the data and the outgoing physical NI for that data) and storing that routing information in the forwarding table(s) 934A-R, and the ND forwarding plane 926 is responsible for receiving that data on the physical NIs 916 and forwarding that data out the appropriate ones of the physical NIs 916 based on the forwarding table(s) 934A-R.

FIG. 9B illustrates an exemplary way to implement a special purpose network device according to some embodiments of the invention. FIG. 9B shows the special purpose network device including cards 938 (typically hot pluggable). While in some embodiments the cards 938 are of two types (one or more that operate as the ND forwarding plane 926 (sometimes called line cards), and one or more that operate to implement the ND control plane 924 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 936 (e.g., a first full mesh coupling the line cards and a second full mesh coupling all of the cards).

Returning to FIG. 9A, the general purpose network device 904 includes hardware 940 comprising a set of one or more processor(s) 942 (which are often COTS processors) and network interface controller(s) 944 (NICs; also known as network interface cards) (which include physical NIs 946), as well as non-transitory machine readable storage media 948 having stored therein software 950, which may also contain the access/backhaul/core node software 925. During operation, the processor(s) 942 execute the software 950 to instantiate one or more sets of one or more applications 964A-R. While one embodiment does not implement virtualization, alternative embodiments may use different forms of virtualization. For example, in one such alternative embodiment the virtualization layer 954 represents the kernel of an operating system (or a shim executing on a base operating system) that allows for the creation of multiple instances 962A-R called software containers that may each be used to execute one (or more) of the sets of applications 964A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes.

In another such alternative embodiment the virtualization layer 954 represents a hypervisor (sometimes referred to as a virtual machine monitor (VMM)) or a hypervisor executing on top of a host operating system, and each of the sets of applications 964A-R is run on top of a guest operating system within an instance 962A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 940, directly on a hypervisor (in which case the unikernel is sometimes described as running within a LibOS virtual machine), or in a software container, embodiments can be implemented fully with unikernels running directly on a hypervisor represented by virtualization layer 954, unikernels running within software containers represented by instances 962A-R, or as a combination of unikernels and the above-described techniques (e.g., unikernels and virtual machines both run directly on a hypervisor, unikernels and sets of applications that are run in different software containers).

The instantiation of the one or more sets of one or more applications 964A-R, as well as virtualization if implemented, are collectively referred to as software instance(s) 952. Each set of applications 964A-R, corresponding virtualization construct (e.g., instance 962A-R) if implemented, and that part of the hardware 940 that executes them (be it hardware dedicated to that execution and/or time slices of hardware temporally shared), forms a separate virtual network element(s) 960A-R.

The virtual network element(s) 960A-R perform similar functionality to the virtual network element(s) 930A-R—e.g., similar to the control communication and configuration module(s) 932A and forwarding table(s) 934A (this virtualization of the hardware 940 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 962A-R corresponding to one VNE 960A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 962A-R to VNEs also apply to embodiments where such a finer level of granularity and/or unikernels are used.

In certain embodiments, the virtualization layer 954 includes a virtual switch that provides similar forwarding services as a physical Ethernet switch. Specifically, this virtual switch forwards traffic between software containers 962A-R and the NIC(s) 944, as well as optionally between the software containers 962A-R; in addition, this virtual switch may enforce network isolation between the VNEs 960A-R that by policy are not permitted to communicate with each other (e.g., by honoring virtual local area networks (VLANs)).

The third exemplary ND implementation in FIG. 9A is a hybrid network device 906, which includes both custom ASICs/proprietary OS and COTS processors/standard OS in a single ND or a single card within an ND. In certain embodiments of such a hybrid network device, a platform VM (i.e., a VM that that implements the functionality of the special purpose network device 902) could provide for para-virtualization to the networking hardware present in the hybrid network device 906.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 930A-R, VNEs 960A-R, and those in the hybrid network device 906) receives data on the physical NIs (e.g., 916, 946) and forwards that data out the appropriate ones of the physical NIs (e.g., 916, 946). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 9C:
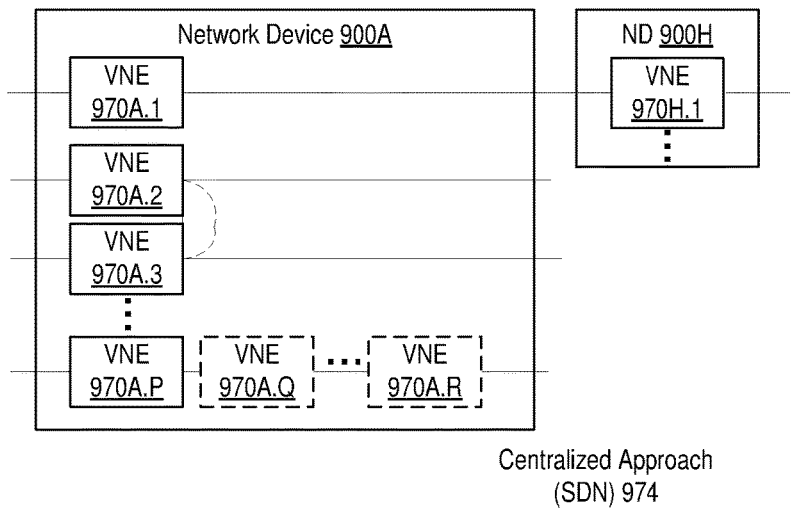
FIG. 9C illustrates various exemplary ways in which virtual network elements (VNEs) may be coupled according to some embodiments of the invention.

FIG. 9C illustrates various exemplary ways in which VNEs may be coupled according to some embodiments of the invention. FIG. 9C shows VNEs 970A.1-970A.P (and optionally VNEs 970A.Q-970A.R) implemented in ND 900A and VNE 970H.1 in ND 900H. In FIG. 9C, VNEs 970A.1-P are separate from each other in the sense that they can receive packets from outside ND 900A and forward packets outside of ND 900A; VNE 970A.1 is coupled with VNE 970H.1, and thus they communicate packets between their respective NDs; VNE 970A.2-970A.3 may optionally forward packets between themselves without forwarding them outside of the ND 900A; and VNE 970A.P may optionally be the first in a chain of VNEs that includes VNE 970A.Q followed by VNE 970A.R (this is sometimes referred to as dynamic service chaining, where each of the VNEs in the series of VNEs provides a different service—e.g., one or more layer 4-7 network services). While FIG. 9C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 9A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 9A may also host one or more such servers (e.g., in the case of the general purpose network device 904, one or more of the virtual machines 962A-R may operate as servers; the same would be true for the hybrid network device 906; in the case of the special purpose network device 902, one or more such servers could also be run on a hypervisor executed by the compute resource(s) 912); in which case the servers are said to be co-located with the VNEs of that ND.

A virtual network is a logical abstraction of a physical network (such as that in FIG. 9A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 9D:
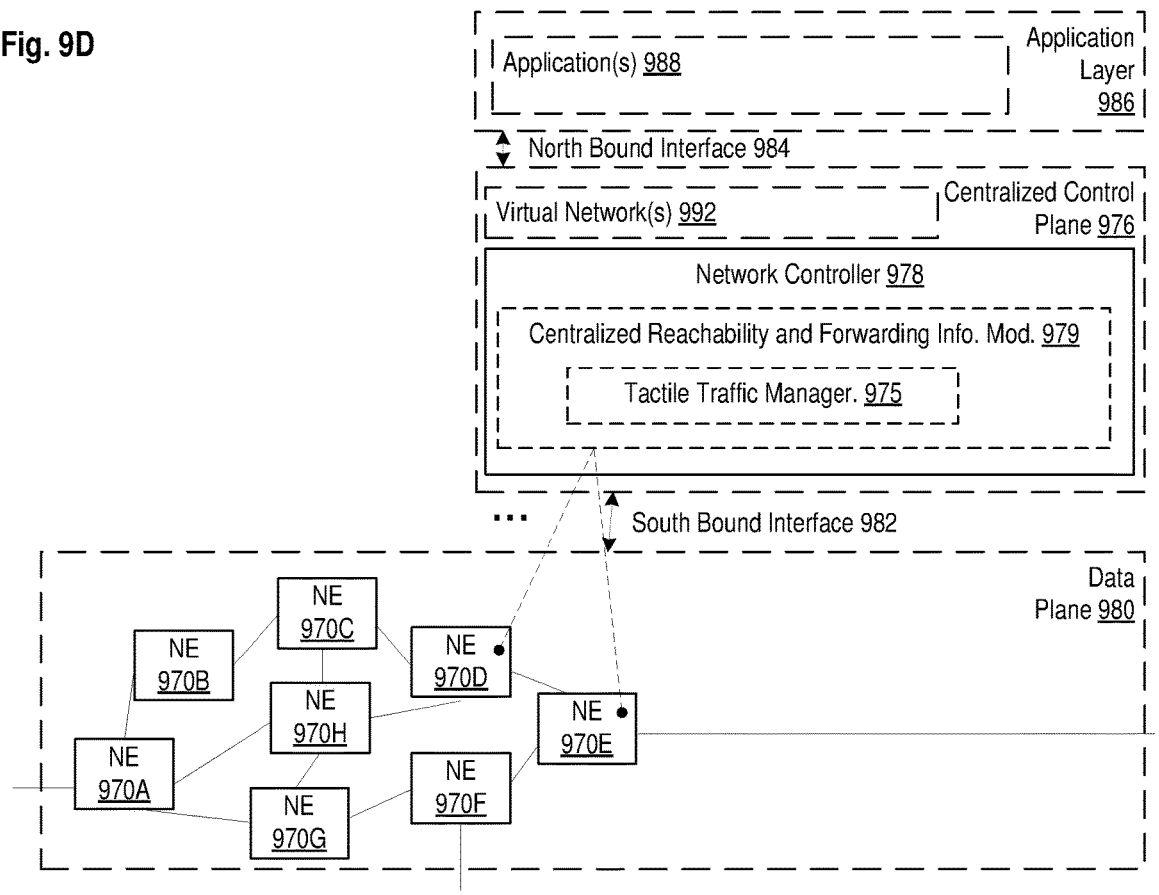
FIG. 9D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 9D illustrates a network with a single network element on each of the NDs of FIG. 9A. Specifically, FIG. 9D illustrates network elements (NEs) 970A-H with the same connectivity as the NDs 900A-H of FIG. 9A with a centralized approach for maintaining reachability and forwarding information (also called network control), according to some embodiments of the invention.

FIG. 9D illustrates that a centralized approach 974 (also known as software defined networking (SDN)) that decouples the system that makes decisions about where traffic is sent from the underlying systems that forwards traffic to the selected destination. The illustrated centralized approach 974 has the responsibility for the generation of reachability and forwarding information in a centralized control plane 976 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 976 has a south bound interface 982 with a data plane 980 (sometime referred to the infrastructure layer, network forwarding plane, or forwarding plane (which should not be confused with a ND forwarding plane)) that includes the NEs 970A-H (sometimes referred to as switches, forwarding elements, data plane elements, or nodes). The centralized control plane 976 includes a network controller 978, which includes a centralized reachability and forwarding information module 979 that determines the reachability within the network and distributes the forwarding information to the NEs 970A-H of the data plane 980 over the south bound interface 982 (which may use the OpenFlow protocol). The centralized reachability and forwarding information module 979 contains a tactile traffic manager 975. The tactile traffic manager 975 within the network controller 978 receives notification from the access node or the core node that an application requires a delay defined for tactile traffic, and the tactile traffic manager 975 in turn causes a backhaul node to install a flow table entry in a flow table of the backhaul node, through which packets of the application is to be forwarded within a latency defined for the tactile traffic. The notification and installation are discussed in more details in relation to FIGS. 1 and 5.

The network intelligence is centralized in the centralized control plane 976 executing on electronic devices that are typically separate from the NDs. For example, where the special purpose network device 902 is used in the data plane 980, each of the control communication and configuration module(s) 932A-R of the ND control plane 924 typically include a control agent that provides the VNE side of the south bound interface 982. In this case, the ND control plane 924 (the compute resource(s) 912 executing the control communication and configuration module(s) 932A-R) performs its responsibility for participating in controlling how data (e.g., packets) is to be routed (e.g., the next hop for the data and the outgoing physical NI for that data) through the control agent communicating with the centralized control plane 976 to receive the forwarding information (and in some cases, the reachability information) from the centralized reachability and forwarding information module 979 (it should be understood that in some embodiments of the invention, the control communication and configuration module(s) 932A-R, in addition to communicating with the centralized control plane 976, may also play some role in determining reachability and/or calculating forwarding information—albeit less so than in the case of a distributed approach; such embodiments are generally considered to fall under the centralized approach 974, but may also be considered a hybrid approach).

While the above example uses the special purpose network device 902, the same centralized approach 974 can be implemented with the general purpose network device 904 (e.g., each of the VNE 960A-R performs its responsibility for controlling how data (e.g., packets) is to be routed (e.g., the next hop for the data and the outgoing physical NI for that data) by communicating with the centralized control plane 976 to receive the forwarding information (and in some cases, the reachability information) from the centralized reachability and forwarding information module 979; it should be understood that in some embodiments of the invention, the VNEs 960A-R, in addition to communicating with the centralized control plane 976, may also play some role in determining reachability and/or calculating forwarding information—albeit less so than in the case of a distributed approach) and the hybrid network device 906. In fact, the use of SDN techniques can enhance the NFV techniques typically used in the general purpose network device 904 or hybrid network device 906 implementations as NFV is able to support SDN by providing an infrastructure upon which the SDN software can be run, and NFV and SDN both aim to make use of commodity server hardware and physical switches.

FIG. 9D also shows that the centralized control plane 976 has a north bound interface 984 to an application layer 986, in which resides application(s) 988. The centralized control plane 976 has the ability to form virtual networks 992 (sometimes referred to as a logical forwarding plane, network services, or overlay networks (with the NEs 970A-H of the data plane 980 being the underlay network)) for the application(s) 988. Thus, the centralized control plane 976 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 9D illustrates the simple case where each of the NDs 900A-H implements a single NE 970A-H, it should be understood that the network control approaches described with reference to FIG. 9D also work for networks where one or more of the NDs 900A-H implement multiple VNEs (e.g., VNEs 930A-R, VNEs 960A-R, those in the hybrid network device 906). Alternatively or in addition, the network controller 978 may also emulate the implementation of multiple VNEs in a single ND. Specifically, instead of (or in addition to) implementing multiple VNEs in a single ND, the network controller 978 may present the implementation of a VNE/NE in a single ND as multiple VNEs in the virtual networks 992 (all in the same one of the virtual network(s) 992, each in different ones of the virtual network(s) 992, or some combination). For example, the network controller 978 may cause an ND to implement a single VNE (a NE) in the underlay network, and then logically divide up the resources of that NE within the centralized control plane 976 to present different VNEs in the virtual network(s) 992 (where these different VNEs in the overlay networks are sharing the resources of the single VNE/NE implementation on the ND in the underlay network).

Figure 9E:
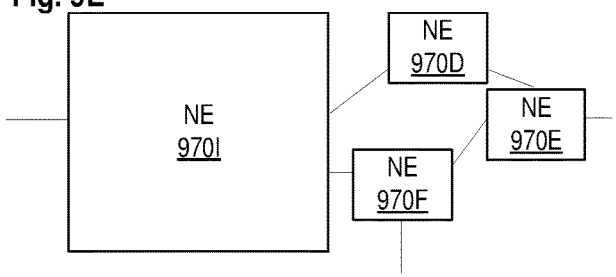
FIG. 9E illustrates the simple case of where each of the NDs implements a single NE, but a centralized control plane has abstracted multiple of the NEs in different NDs into (to represent) a single NE in one of the virtual network(s), according to some embodiments of the invention.
Figure 9F:
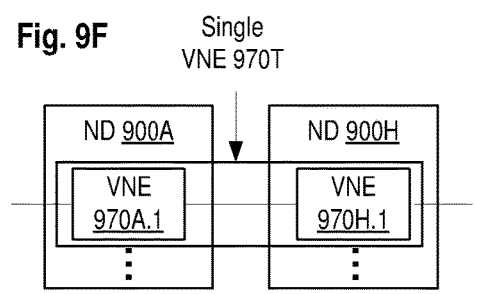
FIG. 9F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 9E and 9F respectively illustrate exemplary abstractions of NEs and VNEs that the network controller 978 may present as part of different ones of the virtual networks 992. FIG. 9E illustrates the simple case of where each of the NDs 900A-H implements a single NE 970A-H (see FIG. 9D), but the centralized control plane 976 has abstracted multiple of the NEs in different NDs (the NEs 970A-C and G-H) into (to represent) a single NE 9701 in one of the virtual network(s) 992 of FIG. 9D, according to some embodiments of the invention. FIG. 9E shows that in this virtual network, the NE 9701 is coupled to NE 970D and 970F, which are both still coupled to NE 970E.

FIG. 9F illustrates a case where multiple VNEs (VNE 970A.1 and VNE 970H.1) are implemented on different NDs (ND 900A and ND 900H) and are coupled to each other, and where the centralized control plane 976 has abstracted these multiple VNEs such that they appear as a single VNE 970T within one of the virtual networks 992 of FIG. 9D, according to some embodiments of the invention. Thus, the abstraction of a NE or VNE can span multiple NDs.

While some embodiments of the invention implement the centralized control plane 976 as a single entity (e.g., a single instance of software running on a single electronic device), alternative embodiments may spread the functionality across multiple entities for redundancy and/or scalability purposes (e.g., multiple instances of software running on different electronic devices).

Figure 10:
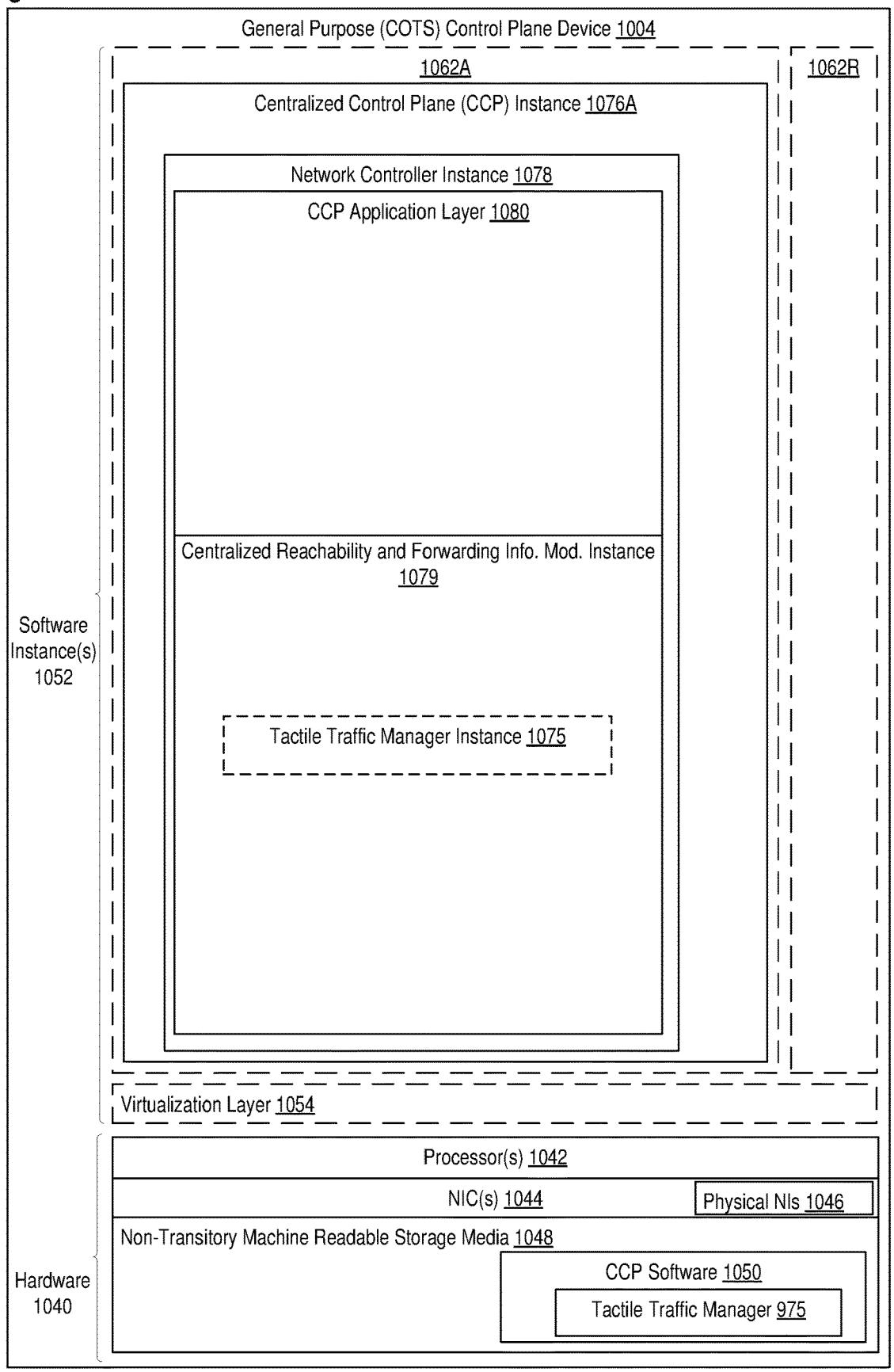
FIG. 10 illustrates a general purpose control plane device with centralized control plane (CCP) software according to some embodiments of the invention.

Similar to the network device implementations, the electronic device(s) running the centralized control plane 976, and thus the network controller 978 including the centralized reachability and forwarding information module 979, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 10 illustrates, a general purpose control plane device 1004 including hardware 1040 comprising a set of one or more processor(s) 1042 (which are often COTS processors) and network interface controller(s) 1044 (NICs; also known as network interface cards) (which include physical NIs 1046), as well as non-transitory machine readable storage media 1048 having stored therein centralized control plane (CCP) software 1050. The CCP software 1050 includes the tactile traffic manager 975 discussed herein above.

In embodiments that use compute virtualization, the processor(s) 1042 typically execute software to instantiate a virtualization layer 1054 and software container(s) 1062A-R (e.g., with operating system-level virtualization, the virtualization layer 1054 represents the kernel of an operating system (or a shim executing on a base operating system) that allows for the creation of multiple software containers 1062A-R (representing separate user space instances and also called virtualization engines, virtual private servers, or jails) that may each be used to execute a set of one or more applications; with full virtualization, the virtualization layer 1054 represents a hypervisor (sometimes referred to as a virtual machine monitor (VMM)) or a hypervisor executing on top of a host operating system, and the software containers 1062A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 1050 (illustrated as CCP instance 1076A) is executed within the software container 1062A on the virtualization layer 1054. In embodiments where compute virtualization is not used, the CCP instance 1076A on top of a host operating system is executed on the "bare metal" general purpose control plane device 1004. The instantiation of the CCP instance 1076A, as well as the virtualization layer 1054 and software containers 1062A-R if implemented, are collectively referred to as software instance(s) 1052.

In some embodiments, the CCP instance 1076A includes a network controller instance 1078. The network controller instance 1078 includes a centralized reachability and forwarding information module instance 1979 (which is a middleware layer providing the context of the network controller 978 to the operating system and communicating with the various NEs), and an CCP application layer 1080 (sometimes referred to as an application layer) over the middleware layer (providing the intelligence required for various network operations such as protocols, network situational awareness, and user—interfaces). A tactile traffic manager instance 1075 is included in the CCP application layer 1080 in one embodiment. At a more abstract level, this CCP application layer 1080 within the centralized control plane 976 works with virtual network view(s) (logical view(s) of the network) and the middleware layer provides the conversion from the virtual networks to the physical view.

The centralized control plane 976 transmits relevant messages to the data plane 980 based on CCP application layer 1080 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 980 may receive different messages, and thus different forwarding information. The data plane 980 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 980, the packet (or a subset of the packet header and content) is typically forwarded to the centralized control plane 976. The centralized control plane 976 will then program forwarding table entries into the data plane 980 to accommodate packets belonging to the flow of the unknown packet. Once a specific forwarding table entry has been programmed into the data plane 980 by the centralized control plane 976, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Each VNE (e.g., a virtual router, a virtual bridge (which may act as a virtual switch instance in a Virtual Private LAN Service (VPLS) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Some NDs include functionality for authentication, authorization, and accounting (AAA) protocols (e.g., RADIUS (Remote Authentication Dial-In User Service), Diameter, and/or TACACS+ (Terminal Access Controller Access Control System Plus). AAA can be provided through a client/server model, where the AAA client is implemented on a ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

The operations of the flow diagrams FIGS. 7-8 are described with reference to the exemplary embodiment of FIGS. 9A-F and 10. However, it should be understood that the operations of flow diagrams can be performed by embodiments of the invention other than those discussed with reference to the exemplary embodiment of FIGS. 9A-F and 10, and the exemplary embodiment of FIGS. 9A-F and 10 can perform operations different than those discussed with reference to the flow diagrams of FIGS. 7-8.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end system, a network device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in an electronic device in a communication network, wherein the communication network includes an access node communicating with end user devices, a backhaul node, and a core node, wherein the backhaul node transmits traffic between the access node and the core node, the method comprising:
    notifying, by the electronic device, a controller that an application has been authorized to transmit tactile traffic in the communication network, the controller communicating with one or more of the access node the backhaul node, and the core node, and the application being to be deployed in an end user device, wherein the controller, responsive to the notifying, causes the backhaul node to install a flow table entry in a flow table of the backhaul node, through which packets of the application is to be forwarded by the backhaul node within a latency defined for the tactile traffic, wherein a round-trip delay of the application in the communication network is within two milliseconds;
    authenticating, by the electronic device, a packet being sourced from or destined to the application that has been authorized to transmit the tactile traffic in the communication network; and
    forwarding, by the electronic device, the packet with the latency defined for the tactile traffic using a priority for the tactile traffic.

2. The method of claim 1, wherein the electronic device comprises the access node or the core node.

3. The method of claim 1, wherein the application obtains an authorization to transmit the tactile traffic, and wherein an indication of the packet is set to indicate the authorization for the application.

4. The method of claim 3, wherein the indication of the packet includes one or more of a subscriber identifier, a session identifier; and one or more quality of service bits.

5. The method of claim 1, wherein the authenticating the packet comprises:
    identifying that the packet includes an indication for transmitting the tactile traffic; and
    verifying that the application has been authorized to transmit the tactile traffic.

6. The method of claim 1, wherein the backhaul node forwards the packet based on the flow table entry with one or more matching fields of a subscriber identifier, a session identifier, and one or more quality of service bits.

7. The method of claim 1, wherein the latency is no more than one millisecond.

8. The method of claim 1, wherein the communication network is a fifth generation mobile network.

9. An electronic device to be implemented in a communication network that includes an access node communicating with end user devices, a backhaul node, and a core node, wherein the backhaul node transmits traffic between the access node and the core node, the electronic device comprising:
- a processor and a non-transitory machine-readable storage medium that coupled to the processor, the non-transitory machine-readable storage medium containing instructions, which when executed by the processor, cause the electronic device to:
  - notify a controller that an application has been authorized to transmit tactile traffic in the communication network, the controller communicating with one or more of the access node, the backhaul node, and the core node, and the application being to be deployed in an end user device, to thereby enable the controller, responsive to the notification, to cause the backhaul node to install a flow table entry in a flow table of the backhaul node, through which packets of the application are to be forwarded by the backhaul node within a latency defined for the tactile traffic, wherein a round-trip delay of the application in the communication network is within two milliseconds,
  - authenticate a packet being sourced from or destined to the application that has been authorized to transmit the tactile traffic in the communication network, and
  - forward the packet with the latency defined for the tactile traffic using a priority for the tactile traffic.

10. The electronic device of claim 9, wherein the electronic device is to comprise the access node or the core node.

11. The electronic device of claim 9, the electronic device is further to:
- identify that the packet includes an indication for transmitting the tactile traffic, and verify that the application has been authorized to transmit the tactile traffic.

12. The electronic device of claim 9, wherein the backhaul node is to forward the packet based on a flow table entry with one or more matching fields of a subscriber identifier, a session identifier, and one or more quality of service bits.

13. The electronic device of claim 9, wherein the communication network is a fifth generation mobile network.

14. A non-transitory machine-readable medium having instructions stored therein, which when executed by a processor, cause the processor to perform operations in an electronic device in a communication network, wherein the communication network includes an access node communicating with end user devices, a backhaul node, and a core node, wherein the backhaul node transmits traffic between the access node and the core node, the operations comprising:
- notifying, by the electronic device, a controller that an application has been authorized to transmit tactile traffic in the communication network, the controller communicating with one or more of the access node, the backhaul node, and the core node, and the application being to be deployed in an end user device, to thereby enable the controller, responsive to the notifying, to cause the backhaul node to install a flow table entry in a flow table of the backhaul node, through which packets of the application are to be forwarded by the backhaul node within a latency defined for the tactile traffic, wherein a round-trip delay of the application in the communication network is within two milliseconds;
- authenticating, by the electronic device, a packet being sourced from or destined to the application that has been authorized to transmit the tactile traffic in the communication network; and
- forwarding, by the electronic device, the packet with the latency defined for the tactile traffic using a priority for the tactile traffic.

15. The non-transitory machine-readable medium of claim 14, wherein the electronic device is the access node or the core node.

16. The non-transitory machine-readable medium of claim 14, wherein the application obtains an authorization to transmit the tactile traffic, and wherein an indication of the packet is set to indicate the authorization for the application.

17. The non-transitory machine-readable medium of claim 16, wherein the indication of the packet is through one or more of a subscriber identifier, a session identifier; and one or more quality of service bits.

18. The non-transitory machine-readable medium of claim 14, wherein the authentication of the packet comprises:
- identifying that the packet includes an indication for transmitting the tactile traffic; and
- verifying that the application of the end user device is authorized to transmit the tactile traffic.

19. The non-transitory machine-readable medium of claim 14, wherein the backhaul node forwards the packet based on a flow table entry with one or more matching fields of a subscriber identifier, a session identifier, and one or more quality of service bits.

20. The non-transitory machine-readable medium of claim 14, wherein the communication network is a fifth generation mobile network.

* * * * *